United States Patent [19]

Nishiyama et al.

[11] Patent Number: 5,694,287
[45] Date of Patent: Dec. 2, 1997

[54] SOLID ELECTROLYTIC CAPACITOR WITH CONDUCTIVE POLYMER AS SOLID ELECTROLYTE AND METHOD OF MANUFACTURING THE SAME

[75] Inventors: Toshihiko Nishiyama; Takashi Fukaumi; Satoshi Arai; Hiromichi Taniguchi; Atsushi Kobayashi, all of Tokyo, Japan

[73] Assignee: NEC Corporation, Tokyo, Japan

[21] Appl. No.: 521,430

[22] Filed: Aug. 30, 1995

[30] Foreign Application Priority Data

Sep. 2, 1994 [JP] Japan .................................. 6-209963

[51] Int. Cl.$^6$ .................................................. H01G 9/00
[52] U.S. Cl. .................... 361/525; 361/523; 361/524; 361/528; 29/25.41; 29/25.42; 29/25.03
[58] Field of Search ................. 252/62.2; 361/523–528, 361/529–534, 503–505, 311–313, 301.1; 29/25.41, 25.42, 25.03

[56] References Cited

U.S. PATENT DOCUMENTS

| 3,673,186 | 6/1972 | Cyba | 544/401 |
| 4,943,892 | 7/1990 | Tsuchiya et al. | 361/525 |
| 5,586,000 | 12/1996 | Sakata et al. | 361/525 |
| 5,590,212 | 12/1996 | Uryu et al. | 381/191 |

FOREIGN PATENT DOCUMENTS

| 0509451 | 10/1992 | European Pat. Off. . | |
| 0 607 781 A1 | 7/1994 | European Pat. Off. | H01G 9/08 |
| 0663673 | 7/1995 | European Pat. Off. . | |
| 4-315412 | 11/1992 | Japan . | |
| 4-315413 | 11/1992 | Japan . | |
| 235455 | 9/1995 | Japan | H01G 9/04 |

*Primary Examiner*—Leo P. Picard
*Assistant Examiner*—Phuong T. Vu
*Attorney, Agent, or Firm*—Sughrue, Mion, Zinn, Macpeak & Seas, PLLC

[57] ABSTRACT

The solid electrolytic capacitor disclosed has a conducting polymer as a solid electrolyte and an antioxidant contained substantially only in a layer disposed in the neighborhood of a surface of the conducting polymer. The antioxidant serves to block the progress of oxidation of organic materials. A capacitor element with conducting polymer not containing the antioxidant is first prepared and this capacitor element is then dipped in a solution containing the antioxidant. Thus, the antioxidant at high concentration is caused to be introduced into the conducting polymer so as to be contained substantially only in a layer disposed in the neighborhood of the surface of the conducting polymer. Since the antioxidant can be introduced by merely dipping the capacitor element in the antioxidant solution, the method can be applied widely to capacitors irrespective of the process of conducting polymer formation. The antioxidant concentration inside the conducting polymer is substantially zero so that the conductivity thereof is not affected.

18 Claims, No Drawings

SOLID ELECTROLYTIC CAPACITOR WITH CONDUCTIVE POLYMER AS SOLID ELECTROLYTE AND METHOD OF MANUFACTURING THE SAME

BACKGROUND OF THE INVENTION

1. Field of the Invention

This invention relates to solid electrolytic capacitors and a method of manufacturing the same, and more particularly to solid electrolytic capacitors using as a solid electrolyte a conducting polymer containing an antioxidant capable of blocking the progress of oxidization of organic materials and a method of manufacturing the same.

2. Description of the Related Art

Electrolytic capacitors utilizing valve action metals, such as tantalum and aluminum, find extensive applications because, through expansion of a dielectric into a very large area obtained by forming the valve action metal as an electrode into the form of a sintered body, an etched foil or the like, it is possible to obtain high capacitance with small size. Particularly, solid electrolytic capacitors using solid electrolytes are indispensable for size reduction, function level-up and cost reduction of electronic apparatuses because of their characteristics whereby they are capable of being readily formed into chips and are suited for surface fitting in addition to their small size and high capacity.

With recent trends for size reduction and function level-up of electronic apparatuses, the frequency increase and digitalization of electronic circuits have become extremely advanced, and there has arisen a demand for solid electrolytic capacitors as a circuit element to have low equivalent series resistance (hereinafter referred to as "ESR") and excellent high frequency characteristics. Under these circumstances, solid electrolytic capacitors using manganese dioxide as an electrolyte has heretofore been used extensively. However, manganese dioxide has a comparatively high conductivity, and thus imposes a limitation on the reduction of the capacitor's ESR. Accordingly, to obtain solid electrolytic capacitors having even more superior high frequency characteristics, there is ongoing research and development in connection with solid electrolytic capacitors using conducting polymers as an electrolyte. As a conducting polymer, use is made of one in which dopant is added to a complex five-membered ring compound, for example, polypyrrole, for producing conductivity. The conductivity produced is several hundred times that of manganese dioxide. The solid electrolytic capacitor using such conducting polymer has excellent characteristics in high frequency range because of the high conductivity of the electrolyte. Besides, unlike the capacitor in which the electrolyte is a decomposed oxide of manganese, such as manganese dioxide obtained by thermal pyrolysis of manganese nitrate, there is no need for giving the capacitor element a thermal hysteresis for electrolyte formation. Thus, the capacitor has features that less damage is caused to its oxide film as dielectric and that it has excellent reliability.

The conducting polymer, however, generally has a characteristic that its conductivity is reduced by oxidization. Therefore, when a capacitor using a conducting polymer in situ as a solid electrolyte is held in a high temperature environment, there arises a phenomenon that the conductivity of the electrolyte is reduced to increase the ESR with the lapse of time. This means that there is room for improvement of the capacitor in connection with heat resistance. To improve heat resistance, there have been proposed several solid electrolytic capacitors, the conducting polymer of which incorporates an antioxidant for blocking the progress of oxidation of the polymer. One such solid electrolytic capacitor is disclosed in Japanese Patent Application Kokai Publication No. Hei 4-315412 (hereinafter referred to as Publication 1). The disclosed solid electrolytic capacitor uses as an electrolyte a conducting polymer which is formed by an electrolytic oxidation polymerization process. In this case, in the electrolytic oxidation polymerization process, electrolytic oxidation is caused while adding an antioxidant (i.e., phenol or phenoxide derivative having at least one nitro group) to an electrolyte containing a polymerizing monomer and a polymerization supporting electrolyte. A capacitor is thus obtained, in which the antioxidant is introduced into the conducting polymer simultaneously with the formation thereof. This method of capacitor manufacture features that the antioxidant is added to a usual electrolyte component.

On the other hand, Japanese Patent Application Kokai Publication No. Hei 4-315413 (hereinafter referred to as Publication 2) shows a capacitor similar to that shown in Publication 1. In this capacitor, an antioxidant is introduced into a conducting polymer simultaneously with the formation thereof through electrolytic oxidation polymerization. However, this method of capacitor manufacture is different from the method of manufacture shown in Publication 1 in that at least one nitro group is provided to the structure of the supporting electrolyte as one component of the liquid electrolyte.

Using the techniques disclosed in the two publications noted above, it is possible to obtain a highly reliable solid electrolytic capacitor, which has low ESR, excellent high frequency range impedance characteristics and satisfactory heat resistance and is free from damage to the dielectric oxide film. However, it is desired to further improve even the capacitor obtained in this way in the following two respects.

(1) The method of conducting polymer formation is limited to the electrolytic oxidation polymerization process.

As is well known in the art, as a method of forming conducting polymer used as the electrolyte of solid electrolytic capacitor, there are two different processes, i.e., an electrolytic oxidation polymerization process and a chemical oxidation polymerization process. In the electrolytic oxidation polymerization process, it is necessary to cause precipitation of electric charge on the dielectric oxide film. Nevertheless, it is impossible to obtain electric charge precipitation directly on the dielectric oxide film because the film is an insulator. Therefore, it is necessary to form, prior to the electrolytic oxidation polymerization, a conductive material as a capacitor electrode for electrolytic oxidation on the dielectric film. According to Publications 1 and 2 noted above, there is used a thermally decomposed oxide of manganese such as manganese dioxide obtained through thermal pyrolysis of manganese nitrate. Alternatively, a conducting polymer formed through chemical oxidation polymerization may be used. At any rate, in the case of the electrolytic oxidation polymerization it is necessary to form an electrode for electrolysis on the oxide film. In contrast, the chemical oxidation polymerization requires no such electrode formation and can thus simplify the process of manufacture. A method of manufacture is thus desired, which permits introduction of an antioxidant not only into conducting polymer by the electrolytic oxidation polymerization process but also into conducting polymer by the chemical oxidation polymerization process.

(2) The concentration of the antioxidant in the conducting polymer is fixed in the thickness direction.

When considered from the fact that the resistivity of the antioxidant is comparatively high and that oxygen is supplied to the conducting polymer from the surface side thereof toward the depth, i.e., toward the dielectric oxide film, it is desirable that the antioxidant be present at high concentration only in the neighborhood of the surface of conducting polymer. However, in the capacitors disclosed in the above two publications, the concentration of the antioxidant in the conducting polymer is constant in the thickness direction because the antioxidant is introduced into the conducting polymer simultaneously with the formation thereof. Therefore, increasing the concentration of the antioxidant on the surface of conducting polymer by the prior art antioxidant introduction process, inevitably results in an increase in the concentration on the inside. That is, this results in the presence of the antioxidant with high resistivity at high concentration in the entire conducting polymer, thus reducing the conductivity of the entire conducting polymer. In consequence, the capacitor's ESR is reduced, and the advantage of using conducting polymer as an electrolyte is lost.

SUMMARY OF THE INVENTION

An object of the invention is to provide a solid electrolytic capacitor using as a solid electrolyte a conducting polymer containing an antioxidant, which, in comparison with prior art solid electrolytic capacitors of the relevant type, is improved in heat resistance without deteriorating the conductivity of the conducting polymer, and thus has excellent high frequency impedance characteristics.

Another object of the invention is to provide a method of manufacturing the above solid electrolytic capacitor having excellent heat resistance, which is applicable not only to capacitors with the conducting polymer thereof formed by the electrolytic oxidation polymerization process but also to capacitors with the conducting polymer thereof formed by the chemical oxidation polymerization process and thus has wider applicability.

According to one aspect of the invention, there is provided a solid electrolytic capacitor comprising:

a conducting polymer as a solid electrolyte; and an antioxidant contained substantially only in a layer disposed in a neighborhood of a surface of the conducting polymer, the antioxidant being for blocking the progress of oxidation of organic materials.

According to another aspect of the invention, there is provided a method of manufacturing a solid electrolytic capacitor having a process of introducing an antioxidant into a conducting polymer, the process of introducing the antioxidant comprising the steps of:

forming a capacitor element with conducting polymer not containing an antioxidant;

dipping the capacitor element in a solution containing the antioxidant, thereby causing the antioxidant to be introduced into the conducting polymer such that the antioxidant is contained substantially only in a layer disposed in a neighborhood of a surface of the conducting polymer, the antioxidant being for blocking the progress of oxidation of organic materials.

It is well known in the art that an organic material generally undergoes gradual change in its structure and characteristics as it is oxidized by oxygen in air. Generally, the organic material contains some radicals (R.) having been generated during its manufacture. Oxygen in air is readily bonded to these radicals (R.) to produce peroxy radicals ($RO_2$.) The oxidation of organic materials proceeds with chain-like progress of oxidizing reaction with the peroxy radicals thus formed as points of start of the reaction. The antioxidant according to the invention is a compound which has a chain reaction prohibition function of capturing the above radicals (R. and $RO_2$) and thus blocking the propagation of the chain. The mechanism of oxidation described above leads to a conclusion that it is when the antioxidant can capture the peroxy radicals as soon as the generation thereof that the antioxidant provides the most effective chain progress prohibition action. From this consideration and also from the fact that oxygen is supplied to the electrolyte from the surface of the conducting polymer in the solid electrolytic capacitor, it can be concluded that the concentration distribution of the antioxidant is more important than the total amount thereof for the provision of the oxidation suppression effect of the antioxidant on the conducting polymer and that the antioxidant is most effectively present at high concentration on the surface of conducting polymer. The invention permits introduction of the antioxidant at high concentration only on the surface of conducting polymer.

According to the invention, a layer of conducting polymer is formed on the dielectric oxide film. This polymer layer is of a usual conducting polymer not containing any antioxidant. This means that the polymer may be formed either by the electrolytic oxidation polymerization process or by the chemical oxidation polymerization process.

The capacitor element with a conducting polymer layer thus formed is then dipped in a solution containing an antioxidant. The dipping is made with the antioxidant solution held at a room temperature or at a higher temperature free from de-doping from the conducting polymer. Thus, the antioxidant is not spread by thermal diffusion into the conducting polymer layer but remains in its high concentration state on the conducting polymer surface. This high concentration of antioxidant can effectively prevent the oxidation of the conducting polymer by oxygen entering from the surface thereof.

According to another aspect of the invention, unlike capacitors in which the electrolyte is a thermally decomposed oxide of manganese such as manganese dioxide, no thermal hysteresis is given to the capacitor element when forming the electrolyte. Thus, the dielectric oxide film is free from damage due to thermal hysteresis, and it is possible to guarantee the reliability comparable to that of the capacitors using the conventional conducting polymers as electrolyte.

Well-known antioxidants which have the above radical capturing effect include phenol derivatives, e.g., o-nitrophenol, m-nitrophenol, p-nitrophenol, etc. However, it is possible to use not only such phenols which have both of the hydroxyl group and the nitro group but also aromatic compounds having at least either the hydroxyl group or the nitro group. Other effective compounds than those noted above are o-phenolsulfonic acid, m-phenolsulfonic acid, p-phenolsulfonic acid, nitrobenzene, and salicylic acid.

PREFERRED EMBODIMENTS OF THE INVENTION

Now, preferred embodiments of the invention will now be described using examples according to the invention in comparison with prior art solid electrolytic capacitors.

EXAMPLE 1

A tantalum sintering was subjected to anodic oxidation in a well-known manner to obtain a tantalum sintered element with a dielectric tantalum oxide film.

Subsequently, polypyrrole was formed as a conducting polymer on the tantalum oxide film, thus obtaining a capacitor element. Polypyrrole was formed by the chemical oxidation polymerization process. In the process, the tantalum sintering element was dipped in an ethanol solution containing 30% of pyrrole, and after its subsequent dipping it was dipped this time in an aqueous solution containing 20% by weight of p-toluenesulfonic acid as a dopant and 20% of ferric chloride as an oxidizing agent.

Then, after drying in a vacuum for 8 hours, p-nitrophenol was introduced as an antioxidant into the polypyrrole of the capacitor element. The antioxidant was introduced by dipping the capacitor element in an aqueous solution containing 8 m·mole/dm$^3$ of p-nitrophenol. The temperature was set to room temperature.

After the dipping the capacitor element was dried in a vacuum for 8 hours, and then a cathode electrode layer was formed by forming a carbon layer and a silver paste layer in the order mentioned on polypyrrole, thus completing a capacitor without an outer package.

This capacitor was used as a sample for heat resistance evaluation. The evaluation was made by a test in which the sample was left under no load at high temperature. Specifically, 20 capacitor samples were placed in a temperature controlled vessel at 125° C., and the capacitor's ESR at 100 Hz was measured. The initial value of ESR, the value thereof after the lapse of 1,000 hours and the ratio of this value to the initial value of ESR are listed in Table 1.

Comparison Example 1

For comparison with Example 1, two different kinds of capacitors were produced with the same structure and in the same process as in Example 1 except for the following points.

(1) Comparison Example 1A

The capacitor was formed without dipping in antioxidant solution.

(2) Comparison Example 1B

The capacitor produced by adding p-nitrophenol (i.e., antioxidant) at the same concentration as in Example 1 to a ferrous chloride aqueous solution (i.e., oxidizing agent) when forming polypyrrole (i.e., conducting polymer) and dispensing with dipping in antioxidant-containing solution.

The above two different kinds of samples in Comparison Examples 1A and 1B were evaluated in the same way as in Example 1. The results are shown in Table 1.

TABLE 1

| | ESR (in mΩ) | | |
|---|---|---|---|
| Sample | Initial value | 1,000 hr. later | ESR increase ratio |
| Example 1 | 120 | 190 | 1.58 |
| Comparison Example 1A | 117 | 6,540 | 55.9 |
| Comparison Example 1B | 780 | 940 | 1.21 |

(Note)
Comparison Example 1A: obtained by not dipping in antioxidant-containing solution.
Comparison Example 1B: obtained by adding antioxidant to chemical oxidation polymerizer.

Referring to Table 1, in Comparison Example 1A, the ESR, although initially low, was increased to about 56 times its initial ESR after the lapse of 1,000 hours, indicating that this comparison example is inferior in the heat resistance. This is thought to indicate that although in Comparison Example 1A the conductivity of polypyrrole as electrolyte is initially high because polypyrrole is free from high resistivity antioxidant, it is reduced with quick progress of oxidation of polypyrrole with the lapse of time.

In Comparison Example 1B, on the other hand, the ESR was increased only to 1.21 times its initial ESR after the lapse of 1,000 hours. Thus, the heat resistance of this capacitor is satisfactory. However, the initial value of ESR was very high, i.e., about 6.5 times or above compared to Example 1 and Comparison Example 1A. This is thought to indicate that since in Comparison Example 1B polypyrrole was formed by adding p-nitrophenol as antioxidant to solution containing ferrous chloride as oxidizing agent, polypyrrole was grown while taking-in the antioxidant as it was formed, thus obtaining a constant concentration of the antioxidant in polypyrrole in the thickness direction. In other words, this is because with increase of the concentration of the antioxidant on the polypyrrole surface up to a level showing heat resistance improvement effect, the antioxidant concentration inside polypyrrole had also been increased to correspond to a reduced conductivity of polypyrrole as a whole.

In contrast, in Example 1 the ESR was initially as low as comparable to that in Comparison Example 1A (without any introduced antioxidant) and, nevertheless, increased to as low level as comparable to that in Comparison Example 1B (with antioxidant introduced uniformly) after the lapse of 1,000 hours. In other words, in Example 1 both the initial ESR and the heat resistance are satisfactory. This can be thought to be attributable to the fact that the antioxidant concentration is high only on the surface of polypyrrole and substantially zero inside polypyrrole.

EXAMPLE 2

In this example, the effects of the concentration of antioxidant on the heat resistance of conducting polymer were examined. The same tantalum capacitor element as in Example 1, with the tantalum oxide film and polypyrrole, was dipped in aqueous solutions containing different concentrations of antioxidant. The antioxidant was p-nitrophenol and introduced in four different concentrations of 2, 4, 8 and 10 m·moles/dm$^3$. The temperature was set to room temperature. After dipping in each antioxidant aqueous solution, drying and cathode electrode layer formation, each sample element was left in a temperature controlled vessel at 125° C. for 500 hours. Before and after its leaving at the high temperature, the ESR at 100 kHz was measured, and the heat resistance was evaluated from the change in ESR. The initial ESR, ESR after 500 hours and the ratio between the two values at the individual antioxidant concentrations are shown in Table 2.

Comparison Example 2

For comparison to Example 2, capacitors were produced in the same way as in Example 2 except for the way of introducing antioxidant into polypyrrole. Specifically, when forming polypyrrole through chemical oxidation polymerization, the same concentrations of antioxidant as in Example 2 were added to the polymerization reaction solution.

As in Example 2, each tantalum sintering element after tantalum oxide film formation was prepared, and polypyrrole containing the antioxidant was formed on the tantalum oxide film in the manner as in Comparison Example 1B. At this time, the amount of p-nitrophenol (i.e., antioxidant) to be added to the ferrous chloride (oxidizing agent) solution was set to 2, 4, 8 and 10 m·moles/dm³ as in Example 2. Then, a cathode electrode layer was formed on each capacitor element with antioxidant-containing polypyrrole in the manner as in Example 2, and then the heat resistance was evaluated. The evaluation was made in the same method as in Example 2. The results of evaluation are shown in Table 2.

TABLE 2

| Antioxidant concentration (m · mole/dm³) | Initial value | 500 hr. later | ESR increase ratio |
|---|---|---|---|
| ESR (in mΩ) | | | |
| Example 2 | | | |
| 2 | 116 | 221 | 1.91 |
| 4 | 121 | 173 | 1.43 |
| 8 | 110 | 114 | 1.04 |
| 10 | 127 | 127 | 1.00 |
| Comparison Example 2 | | | |
| 2 | 121 | 1,620 | 13.4 |
| 4 | 149 | 1,570 | 10.5 |
| 8 | 360 | 1,011 | 2.81 |
| 10 | 794 | 941 | 1.19 |

Referring to Table 2, both in Example 2 and Comparison Example 2 the ESR ratio of the initial ESR to the ESR after 500 hours is reduced with increasing antioxidant concentration, that is, the heat resistance is improved with increasing antioxidant concentration. Particularly, in Comparison Example 2 it can be said from the extent of increase of the ESR after 500 hours that the heat resistance improvement effect is pronounced when the antioxidant concentration is 8 m·moles/dm³ or above. However, in Comparison Example 2, when this antioxidant concentration level (i.e., 8 m·moles/dm³) is exceeded, the initial ESR which has been in the order of 100 mΩ suddenly turns to be increased to go beyond 300 mΩ. In other words, if the heat resistance is to be improved, it leads to deterioration of the initial ESR.

In contrast, in Example 2, the initial ESR is held at 127 mΩ even when the antioxidant concentration is increased to 10 m·moles/dm³, that is, increasing the antioxidant concentration has no effect on the initial ESR. In other words, by increasing the antioxidant concentration it is possible to improve the heat resistance while guaranteeing the low ESR.

EXAMPLE 3

In this example, influence of the temperature when introducing the antioxidant, i.e., the temperature of the antioxidant solution, was examined.

The same tantalum sintering element as in Example 1 was used, and after formation of polypyrrole on the tantalum oxide film it was held dipped in an aqueous solution containing 4 m·moles/dm³ p-nitrophenol for 30 minutes. At this time, the temperature of the p-nitrophenol was set to 5°, 25°, 50° and 70° C. After the dipping, drying and cathode electrode formation were made in the manner as in Example 1, and the heat resistance was evaluated in the manner as in Example 1 (except for that the time of leaving at high temperature was set to 500 hours). The result of evaluation was shown in Table 3.

TABLE 3

| Antioxidant temperature (°C.) | Initial value | 500 hr. later | ESR increase ratio |
|---|---|---|---|
| ESR (in mΩ) | | | |
| 5 | 118 | 192 | 1.63 |
| 25 | 125 | 164 | 1.31 |
| 50 | 119 | 131 | 1.10 |
| 70 | 341 | 367 | 1.07 |

Referring to Table 3, while the ESR increase after 500 hours is reduced with increasing antioxidant temperature, the ESR increase is only up to about 1.63 times even at as low temperature as 5° C. Thus, it will be seen that sufficient heat resistance improvement effect can be obtained. However, at an antioxidant temperature of 70° C., although the ESR after 500 hours was only 1.07 times the initial value, indicating the most satisfactory heat resistance, the initial ESR was extremely high compared to those at the other temperatures. It was thus found that there is an upper limit on the temperature of the antioxidant introduction.

The above results can be explained as follows. With antioxidant solution temperature increase, the concentration of antioxidant introduced onto the pyrrole surface is increased to enhance the heat resistance of the obtained polypyrrole. On the other hand, the dipping of the capacitor element in the high temperature antioxidant solution results in dissolution of the dopant for producing conductivity to polypyrrole, thus reducing the conductivity of polypyrrole and increasing the initial ESR of the capacitor. Actually, it has been confirmed that the dopant ion concentration in the antioxidant solution after the dipping of the capacitor element is increased with increasing antioxidant solution temperature. From this fact, it may be said that the increase of the initial ESR that results from the dipping in high temperature antioxidant solution stems from de-doping of polypyrrole. Generally, the temperature of dipping in the antioxidant solution is desirably a certain high temperature which is lower than the temperature, at which the conducting polymer is deteriorated by de-doping, and such a temperature preferably may be about 50° C. in the case where polypyrrole is used as conducting polymer.

EXAMPLE 4

In this example, the heat resistance was examined by using o-phenolsulfonic acid and nitrobenzene in lieu of p-nitrophenol which was used as an antioxidant in the previous examples and comparison examples.

Capacitor element was formed up to polypyrrole formation in the manner as in Example 1, and then held dipped in each of aqueous solutions containing 8 m·moles/dm³ of o-phenolsulfonic acid and nitrobenzene, respectively. The dipping, drying and cathode electrode layer formation were conducted in the manner as in Example 1 to produce each capacitor for the heat resistance the evaluation. The heat resistance evaluation was conducted under the same conditions as in Example 1. The results of evaluation are shown in Table 4.

TABLE 4

| Antioxidant | ESR (in mΩ) | | |
|---|---|---|---|
| | Initial value | 1,000 hr. later | ESR increase ratio |
| o-phenolsulfonic acid | 115 | 180 | 1.71 |
| nitrobenzene | 121 | 209 | 1.73 |

Referring to Table 4, in either capacitor the ESR increase after leaving the capacitor at high temperature for 1,000 hours is only about 1.7 times the initial ESR. This means that o-phenolsulfonic acid and nitrobenzene both have the antioxidant effect. Thus, it can be said that not only aromatic compounds having both the hydroxyl group and the nitro group such as p-nitrophenol but also aromatic compounds having at least either hydroxyl group or nitro group, are effective as antioxidants to be used according to the invention. Examples of aromatic compounds which can be used according to the invention are, in addition to p-nitrophenol, o-phenolsulfonic acid and nitrobenzene given above, o-nitrophenol, m-nitrophenol, p-phenolsulfonic acid, m-phenolsulfonic acid, salicylic acid, etc.

EXAMPLE 5

In this example, it was confirmed that the invention is effective not only to conducting polymer compounds formed through chemical oxidation polymerization but also to conducting polymers formed through electrolytic oxidation polymerization.

The same tantalum sintering element with tantalum oxide film as in Example 1 was prepared, and a manganese dioxide layer was formed as a precoat layer on the tantalum oxide film. While the formation of conducting polymer by the electrolytic oxidation polymerization process requires precipitation of electric charge, it is impossible to cause precipitation of electric charge on the tantalum oxide film as an insulator. Accordingly, it is necessary to form some conductive layer in advance on the dielectric oxide film. The precoat layer serves as such conductive layer. The precoat layer is required to have certain conductivity and be as thin so as to have no adverse effects on the conducting polymer. To meet these requirements, in this example, the capacitor element was dipped in a methanol solution containing 10% by weight of manganese nitrate, and a manganese dioxide layer was formed on the tantalum oxide film through thermal pyrolysis in a temperature controlled vessel at 250° C.

Polypyrrole was then formed by the electrolytic oxidation polymerization process on the capacitor element after the manganese dioxide layer formation. In the formation process, the capacitor element was dipped in an acetonitrile solution containing 1% by weight of pyrrole and 2% by weight of p-toluenesulfonic acid, the plus electrode of a power supply was connected to the precoat layer, the minus electrode of the power supply was connected to an electrode disposed in the solution, and current was caused to pass from the plus to the minus electrode. By this process, polypyrrole was formed on the manganese dioxide layer as precoat layer.

Then, the capacitor element was dipped in an aqueous solution containing p-nitrophenol as antioxidant. The concentration of p-nitrophenol was set to 2, 4, 8, 10 m·moles/dm$_3$ as in Example 2.

Thereafter, a cathode electrode layer was formed on polypyrrole in the same manner as in Example 1. Using these samples, the heat resistance was evaluated under the same conditions as in Example 2. The results of the evaluation are shown in Table 5.

Comparison Example 3

For comparison with Example 5, a capacitor was produced, which was based on the prior art method of manufacture disclosed in Japanese Patent Application Kokai Publication No. Hei 4-315412. This Comparison Example 3 is the same as Example 5 in so far as conducting polymer based on the electrolytic oxidation polymerization is the electrolyte of the capacitor, but it is different from Example 5 in that the antioxidant is introduced not after but during and simultaneously with the conducting polymer formation.

In this case, a precoat layer was formed on the tantalum oxide film in the same manner as in Example 5, and polypyrrole was formed on the precoat layer with the same equipment as in Example 5. At this time, a solution was used which was obtained by adding p-nitrophenol as antioxidant to an acetonitrile solution containing as electrolyte 1% by weight of pyrrole and 2% by weight of p-toluenesulfonic acid. The concentration of p-nitrophenol in the electrolyte solution was set to four different values, i.e., 2, 4, 8 and 10 m·moles/dm$^3$. The polypyrrole thus formed contains p-nitrophenol as an antioxidant. After the formation of polypyrrole with antioxidant a cathode electrode layer is formed thereon. Each capacitor thus obtained was used as sample for a heat resistance evaluation. The results of the evaluation are shown in Table 5.

TABLE 5

| Antioxidant concentration (m · mole/dm$^3$) | ESR (in mΩ) | | |
|---|---|---|---|
| | Initial value | 500 hr. later | ESR increase ratio |
| Example 5 | | | |
| 2 | 132 | 240 | 1.82 |
| 4 | 127 | 181 | 1.51 |
| 8 | 116 | 119 | 1.03 |
| 10 | 140 | 143 | 1.02 |
| Comparison Example 3 | | | |
| 2 | 141 | 1,790 | 12.7 |
| 4 | 173 | 1,940 | 11.2 |
| 8 | 420 | 1,270 | 3.02 |
| 10 | 970 | 989 | 1.02 |

Referring to Table 5, in Comparison Example 3, while the antioxidant concentration is low, i.e., 2 to 4 m·moles/dm$^3$, the ESR ratio of the ESR after 500 hours to the initial ESR exceeds 11 times, thus providing for no heat resistance improvement effect, and it is only when the antioxidant is increased to 8 m·moles/dm$^3$ that the heat resistance improvement effect begins to be observed. Even in this case, however, the ESR increase is in excess of 3.0 times the initial ESR and, for obtaining sufficient effects, the antioxidant concentration has to be 10 m·moles/dm$^3$ or above. At such a high concentration, however, the initial ESR itself is as high as about six times the value in case of low concentration (i.e., 2 to 4 m·moles/dm$^3$). In other words, in Comparison Example 3 it is impossible to improve the heat resistance while holding low polypyrrole conductivity.

In contrast, in Example 5 even at a low antioxidant concentration of 2 m·moles/dm$^3$ the ESR after 500 hours is increased to only about 1.82 times the initial ESR at the most. Sufficient heat resistance improvement effect thus can be obtained. Besides, even when the antioxidant concentration was increased to 10 m·moles/dm$^3$, the initial ESR was not substantially increased, and no adverse effect of the antioxidant increase on the initial ESR was observed.

From the above results, the following can be said. In the prior art method of manufacture disclosed in Japanese Patent Application Kokai Publication No. Hei 4-315412 (i.e., a method in which antioxidant is introduced simultaneously with the conducting polymer formation), when the antioxidant concentration on the polypyrrole surface is increased until the heat resistance improvement effect is obtained, the concentration inside polypyrrole is also increased, thus deteriorating the conductivity of polypyrrole. In contrast, in Example 5, since the capacitor element is only dipped in antioxidant solution after the polypyrrole formation, the antioxidant is held at high concentration on the polypyrrole surface, and the antioxidant concentration inside polypyrrole is substantially zero. In this way, the effects obtainable in Example 5 are based on the dipping of the capacitor element in the antioxidant solution after the polypyrrole formation and not based on whether polypyrrole is formed through electrolytic oxidation polymerization or through chemical oxidation polymerization. This conclusion is supported by the fact that the initial ESR is suddenly increased by increasing the antioxidant concentration to 8 m·moles/dm$^3$ or above, at which point the heat resistance improvement effect begins to be observed in the heat resistance evaluation (referring to Table 2) of Comparison Example 2. From the above it can be said that according to the invention it is possible to obtain the same effects when the invention is applied to capacitors with the electrolyte thereof being a conducting polymer obtainable by either the chemical oxidation polymerization process or the electrolytic oxidation polymerization process.

As has been described in the foregoing, according to the invention a conducting polymer layer is first formed on dielectric oxide film. This polymer layer is of an ordinary conducting polymer not containing any antioxidant. Thus, it may be formed either by the electrolytic oxidation polymerization process or by the chemical oxidation polymerization process.

According to the invention, the antioxidant is introduced into the conducting polymer by dipping the capacitor element, which has the above conducting polymer layer not containing any antioxidant, in an antioxidant-containing solution. The dipping is made with the antioxidant solution held at room temperature or a higher temperature but not so high as the temperature at which the conducting polymer is de-doped. Thus, the antioxidant is not spread by thermal diffusion into the conducting polymer layer but is substantially retained in a high concentration state on the electrolyte surface. This high concentration antioxidant has an effect of effectively preventing the oxidization chain reaction of conducting polymer by oxygen supplied from the conducting polymer surface. It is thus possible to improve the heat resistance while maintaining a low initial ESR of conducting polymer.

Further, according to the invention, unlike solid a electrolytic capacitor with the electrolyte thereof being a thermally decomposed oxide of manganese, such as manganese nitrate, there is no need of giving the capacitor element a thermal hysteresis when forming the electrolyte. Thus, the dielectric oxide film is free from damage that might otherwise be caused by thermal hysteresis, and it is possible to ensure reliability comparable to that of the prior art capacitor with the electrolyte thereof being a conducting polymer compound.

Thus, according to the invention it is possible to provide a solid electrolytic capacitor, which uses a conducting polymer containing an antioxidant as solid electrolyte and, unlike the prior art solid electrolytic capacitor of the relevant type, permits heat resistance improvement without sacrifice in the initial ESR, as well as having excellent high frequency impedance characteristics.

Further, according to the invention, there is provided a method of manufacturing solid electrolytic capacitor with excellent heat resistivity as noted above, which has excellent applicability ins afar as it can be applied to capacitors with the conducting polymer formed not only by the electrolytic oxidation polymerization process but also by the chemical oxidation polymerization process.

Furthermore, according to the invention, the antioxidant at high concentration is introduced into only the neighborhood of the surface of the conducting polymer. Since the antioxidant can be introduced by merely dipping the capacitor element in the antioxidant solution, the method can be applied widely to capacitors irrespective of the process of conducting polymer formation. Also, since the antioxidant concentration inside the conducting polymer is substantially zero, the conductivity thereof not affected.

What is claimed is:

1. A solid electrolytic capacitor comprising:
   an anode, a dielectric film and a conducting polymer layer as solid electrolyte;
   wherein said conducting polymer layer comprises an antioxidant introduced into the surface of said conducting polymer distant from the anode side of said capacitor, said antioxidant being for blocking the progress of oxidation of organic materials.

2. A method of manufacturing a solid electrolytic capacitor, said method comprising the steps of:
   forming a capacitor element comprising an inner anode, a dielectric film layer on the surface of said anode and a conducting polymer layer on the outside of said dielectric film layer, said conducting polymer layer not containing an antioxidant; and
   dipping said capacitor element in a solution containing an antioxidant, thereby causing the antioxidant to be introduced into the conducting polymer layer at the surface of said conducting polymer layer away from the dielectric oxide film, said antioxidant being for blocking the progress of oxidation of organic materials.

3. The method of manufacturing solid electrolytic capacitor according to claim 2, in which said antioxidant employs an aromatic compound having at least one of a hydroxyl group and a nitro group.

4. The method of manufacturing solid electrolytic capacitor according to claim 3, in which said aromatic compound comprises one of p-nitrophenol, o-phenolsulfonic acid, nitrobenzene, o-nitrophenol, m-nitrophenol, p-phenolosulfonic acid, and m-phenolsulfonic acid.

5. The method of manufacturing a solid electrolytic capacitor according to claim 2, wherein said conducting polymer layer is formed by a chemical oxidation process.

6. The method of manufacturing a solid electrolytic capacitor according to claim 5, wherein said conducting polymer layer is formed by chemically oxidizing pyrrole.

7. The method of manufacturing a solid electrolytic capacitor according to claim 6, wherein said pyrrole is chemically oxidized with a ferric chloride oxidant.

8. The method of manufacturing a solid electrolytic capacitor according to claim 7, wherein said conducting polymer further comprises p-toluenesulfonic acid as dopant, and wherein said capacitor element is dipped into a solution comprising pyrrole, p-toluenesulfonic acid and ferric chloride.

9. The method of manufacturing a solid electrolytic capacitor according to claim 2, wherein said conducting polymer layer is formed by an electrolytic oxidation process.

10. The method of manufacturing a solid electrolytic capacitor according to claim 9, wherein a manganese dioxide precoat film is formed on said dielectric layer prior to said electrolytic oxidation process.

11. A solid electrolytic capacitor comprising:

a valve action metal anode, a dielectric oxide film on the surface of said anode and a conducting polymer layer as solid electrolyte on the outside of said dielectric oxide film;

wherein said conducting polymer layer comprises an antioxidant introduced into the surface of said conducting polymer distant from said dielectric oxide layer, said antioxidant being for blocking the progress of oxidation of organic materials.

12. A capacitor according to claim 11, wherein said valve action metal is tantalum or aluminum.

13. A capacitor according to claim 11, wherein said capacitor element does not comprise a manganese dioxide conducting layer, and wherein said conducting polymer layer is affixed directly to said dielectric oxide layer.

14. A capacitor according to claim 11, wherein said capacitor element comprises a manganese dioxide conducting layer between said conducting polymer layer and said dielectric oxide layer.

15. A capacitor according to claim 13, wherein said conducting polymer layer comprises polypyrrole.

16. A capacitor according to claim 15, wherein said conducting polymer layer comprises a dopant which is different from said antioxidant.

17. A capacitor according to claim 16, wherein said dopant is p-toluenesulfonic acid, and wherein said antioxidant is selected from the group consisting of p-nitrophenol, o-phenolsulfonic acid, nitrobenzene, o-nitrophenol, m-nitrophenol, p-phenolosulfonic acid, and m-phenolsulfonic acid.

18. A capacitor according to claim 16, wherein said antioxidant is p-nitrophenol.

* * * * *